United States Patent Office 2,922,720
Patented Jan. 26, 1960

2,922,720

GLASS COMPOSITION COLORED BY COPPER AND TIN, AND METHOD OF MANUFACTURING SAME

Thomas B. Parks, Milwaukee, Wis., assignor to Jos. Schlitz Brewing Co., Milwaukee, Wis., a corporation of Wisconsin No Drawing. Application June 20, 1957
Serial No. 667,044

6 Claims. (Cl. 106—52)

This present application is a continuation-in-part of the copending application of the same inventor, for "Glass Composition Colored by Copper and Tin and Method of Manufacturing Same," Serial No. 557,141, filed January 3, 1956, and now abandoned.

This present invention relates to glass composition colored by copper and tin, and method of manufacturing same. The colored glass of this invention is chiefly ruby, from pink through red to black, and the invention more particularly resides in a composition and a method for its preparation, wherein there is included with the ordinary ingredients of a silicate-glass-making mix, copper introduced prior to the melt, accompanied by urea, the coloration being assisted by the inclusion of tin.

Copper has long been used as a coloring agent for glass to develop a ruby coloration; but in order to obtain the desired effect in open or tank furnace melting, it has been necessary to use, in conjunction with the copper, cyanogens as reducing agents. Practical commercial production of ruby glass, in this fashion, has been carried on, but a serious toxicity problem is, of course, involved. Some have asserted that pulverized coal may be substituted for the cyanogen, but if coal be used, difficulties with free carbon, sulfur compounds, and metallic oxides, may be expected. A variety of other reducing agents are known to be effective but only when used in conjunction with closed pot melting.

Full coloration is not developed in either cyanogen or coal reduced copper ruby glass unless the finished articles are subjected to striking. Another difficulty which has been encountered with cyanogen reduced copper and coal reduced copper, is that it has been found necessary to suppress streaking and lack of uniformity by inclusion of bismuth, and this element may cause a dark surface-haze, which obscures both the transparency and the color of the glass beneath.

It is an object of this invention to prepare from ordinary silicate-glass-making materials, in open or tank furnaces, a glass having a color dependent upon the presence of metallic copper.

It is a further object that this glass be free of any appreciable surface haze due to bismuth.

It is a further object that this glass be prepared without resort to ground coal as a reducing substance or to the dangerous and toxic cyanogen reducing substances.

It is a further object that this glass be able to develop its full color with or without striking.

It is a further object that the process be very inexpensive.

In practicing this invention, a silicate-glass-making batch may be prepared from the usual ingredients. The term "silicate glass" is well-known in the trade, and includes for example soda-lime-silicate glass, borosilicate glass, lead glass, and barium glass. To the usual silicate-glass-making ingredients, the coloring mixture is then added.

This coloring mixture comprises the following ingredients: (1) urea, as urea or as biuret or other pyrolytic products of urea; (2) a copper compound capable of combining with ingredient No. 1 above; and (3) metallic tin (preferably comminuted) or an appropriate tin compound.

The following copper compounds are appropriate: cuprous oxide, cupric oxide, and copper acetates, borate, carbonates, chlorides, cyanurate, hydroxides, nitrate, oxalate, phosphates, and sulfates. Mixtures of appropriate copper compounds may be employed, and such mixtures are to be considered as though a single compound within the scope of the claims. Cuprous oxide is preferable, cupric oxide being a close second.

The following tin compounds are appropriate: stannic oxide, stannous oxide, and tin chlorides, oxalate, and sulfates. Mixtures of appropriate tin compounds, mixed with or without metallic tin, may be employed, and such mixtures are to be considered as though a single compound within the scope of the claims. Stannic oxide is preferable, stannous oxide being a close second.

The ingredients of the copper-tin-urea mixture can be added unreacted to the glass-making mix. Or all three ingredients can be reacted together, then ground, and then added to the mix. Or the copper and urea ingredients can be reacted together, then ground, and then added, the tin ingredients being added unreacted. Accordingly the term "urea" is used in the claims as generically including urea, biuret, and other pyrolytic products of urea; and the term "adding a copper-tin-urea mixture" is used in the claims as generically including adding the several ingredients of this mixture in any manner to the silicate-glass mix.

The coloration effected by the present invention is due to the colloidal suspension of particles of metallic copper in the glass. On the analogy of gold ruby glass, it is believed that below a certain size the copper particles produce no color effect; within an optimum range of size they produce the ruby colors (the intensity depending on the concentration of the copper); and above that range the copper color combines with the wave-length-reflection effect to produce a livery coloration.

The exact action of the tin is not understood, but the presence of small quantities of a tin compound has been found essential to enable the copper to produce the desired effect.

The success of present invention is believed to be due to its producing the right particle-size and distribution of copper particles, even without striking. And although, as already stated, the present invention is not limited to the order of introduction of the ingredients of the copper-tin-urea mixture, it has been found that the best results are obtained if the three ingredients are all reacted together before being added. This is believed due to a better particle size and distribution of the metallic copper in the finished glass, when the copper and urea are reacted together before being added, and to a better juxtaposition of the copper particles and the particles of the tin-compound in the finished glass when all three ingredients are reacted together before being added.

Regardless of what copper compound is employed, one atomic weight of cuprous copper will require four molecular weights of urea, or the corresponding weight of a pyrolytic product of urea, for example two molecular weights of biuret. An excess of urea, or its pyrolytic products, however, does not affect the coloring adversely, unless upwards of 10 to 12 molecular weights of urea (or corresponding weights of pyrolytic products of urea) are used for each atomic weight of cuprous copper. Larger excesses may produce carbon deposits and a resulting loss of general transparency.

In the case of cupric copper compounds, the above-mentioned figures should be doubled.

Modified reds may be obtained by the presence of coloring oxides, such as iron, cobalt, nickel, manganese, and the like, in the finished glass, especially in the case of the lighter reds of the lower copper concentrations; and such modified colors are within the scope of the present invention.

The present invention may be practiced as follows. It is usual to prepare the copper-tin-urea mixture first in considerable quantity. As already stated, this may be performed in various ways.

For example copper biuret, so termed even when the precise stoichiometric ratio of its ingredients is not attained, may be prepared by first heating urea to a temperature of from 120° to 160° C. or thereabouts to initiate softening, melting and decomposition, during which melting and decomposition ammonia is given off and there is formed molten biuret. This preliminary heating step is substantially complete in approximately fifteen to twenty minutes, and the melt is then ready to receive the addition of an appropriate copper compound, preferably in the form of a powder. The proper proportions of urea and copper compound have already been stated. The powder is added slowly with stirring. A deep blue copper complex begins to form at once, but the reaction is not complete until held for about fifteen to thirty minutes at approximately 170° to 175° C. However it is not essential, although preferable, that this additional heating occur at exactly this point, as it may be supplied by later conventional steps of the glass-making. The melted composition is then poured on a cold surface to chill and solidify it after which the solidified material may be reduced to a powder mechanically.

The tin required in the composition may be added directly to the copper biuret melt, before the melt is solidified, in the form of metallic tin or an appropriate tin compound, as described earlier herein. When the tin is thus added, a tin-copper complex is formed which may be termed tin-copper biuret.

The tin ingredient, instead of being added to the copper biuret melt, as above described, may be later mixed with the ground copper biuret, or with the other glass-making ingredients.

Or the urea ingredient, the copper ingredient, and the tin ingredient may be merely mixed into the other glass making ingredients, and the whole then fused, but such renders difficult the uniform incorporation of the copper and its effective reduction. Streaking may ensue and dark and cloudy carbon inclusions may occur from decomposition of excess urea not accessible to copper because the mixture is not sufficiently intimate.

The quantity of tin employed should be such as to cause the concentration of tin, by weight, in the finished glass, in terms of stannic oxide, to range between ¼ and 3½ times the concentration of copper in terms of cuprous oxide. Although there appears to be little advantage from the color standpoint in tin concentrations in excess of about 0.25% in terms of stannic oxide, somewhat higher percentages have little disadvantage other than increased cost, which however is a serious consideration.

But too much tin produces a livery color in the glass. Three and one-half times the concentration of copper is believed to be a safe upper limit.

As stated earlier herein, the tin can be introduced in the form of either metallic tin, or one of certain stannous or stannic compounds. But if a stannic compound be used, a corresponding excess of urea should be introduced to compensate for that which is oxidized by the stannic compound.

By introducing, into the glass-making mix, the copper already reacted with the urea, a sustained reducing effect carrying through the glass-making operation apparently occurs. This not only produces metallic copper in the quantity required for coloration but also causes precipitation of this copper in a distribution and particle size which reaches optimum color levels simultaneously with the completion of the glass article. Neither bismuth to moderate and extend the precipitation of the copper, nor striking to develop the color appear to be necessary, except where the glass is so worked that reprecipitation of copper becomes advisable, and a glass free of the darkening haze of bismuth inclusions is produced by a shorter and more economical operation.

However, where processing must be prolonged for any reason, or where the surface condition produced by bismuth is desirable, bismuth may, at times, be included to advantage, although its presence is not required and is not ordinarily advantageous.

In the practice of the present invention, regardless what copper, tin, and urea ingredients are selected, and whether and how combined or not before addition, these ingredients are customarily added to the conventional ingredients of the selected silicate-glass-making mix, and then thoroughly blended; before being charged into the crucible.

The ratios of the copper, tin, and urea ingredients have already been discussed. The total quantity of the copper-tin-urea mixture to be added, should be such that the concentration of copper in the finished glass, in terms of cuprous oxide, will fall between 0.03% and 0.25%. 0.03% to 0.05% produces a pink coloration; 0.05% to 0.125% produces the light and brighter ruby reds; 0.125% to 0.25% produces dark reds; above 0.25% produces nearly black.

Where the best ruby colors are desired, it will be found desirable to include in the initial mix, barium or strontium, either as an appropriate barium or strontium compound. The following are appropriate compounds: the respective acetate, borate, carbonate, chloride, hydroxide, nitrate, nitrite, oxalate, oxide, peroxide, phosphates, silicate, sulfate, and sulfite. Mixtures of appropriate barium and/or strontium compounds may be employed, and such mixtures are to be considered as though a single compound within the scope of the claims. Barium is preferred, and the preferred form for its introduction is barium carbonate. The quantity to be added should, in any case, be such that the concentration thereof in the finished glass, in terms of barium oxide and/or strontium oxide, falls between 0.1% and 1.0%. While clarity, color, and gloss are improved by barium or strontium, the other physical properties of the glass appear to be unimpaired.

Inasmuch as barium (introduced in the form of barium carbonate or barium oxide) is a conventional ingredient of barium silicate glass, in addition to its particular value in connection with ruby glass, the upper limit of 1.0% does not hold for those two compounds, and may be greatly exceeded without harm. But, if introduced in the form of other of the earlier listed barium compounds in excess of 1.0%, or in the form of strontium compounds in excess of 1.0%, it is liable to adversely affect the development of the ruby color.

Conventional blending, charging, melting, fining, and annealing techniques may be followed, just as though the copper-tin-urea mixture had not been added to the mix. Generally no striking step is necessary, but in exceptional circumstances, may be employed to enhance the effect.

The final result is a colored glass consisting of a fusible solid predominantly comprising silicious and basic oxides, colored by containing colloidally suspended precipitated metallic copper derived from the pyrolytic decomposition of copper compounded with urea, assisted by a tin compound, and further assisted by the presence of barium or strontium in some form, if employed.

EXAMPLE 1

As a specific instance, a glass composition was made up by weighing up and mixing on a roll mill to thoroughly blend the same 1,044 parts of sand, 94 parts of potassium carbonate, 377 parts of sodium carbonate, 230 parts of calcium carbonate, 44 parts of borax, and 93 parts of nepheline syenite. To this was added and thoroughly blended: 2.4 parts of stannic oxide, and 13 parts of copper biuret, prepared as described earlier herein from urea and cuprous oxide.

The blended mix was then charged at intervals in divided portions into an open crucible preheated in a gas fired furnace to approximately 1,500° C. Charging was at a rate low enough so that temperatures were maintained above 1,450° C. The fully charged batch was then heated for one hour at 1,500° C. to insure complete melting. The temperature was then lowered to 1,450° C. for one hour of preliminary fining. Fining was completed by permitting the temperature of the melt to decrease to 1,400° C. during a period of approximately one-half hour.

The melt at a temperature between 1,350° and 1,400° C. was then poured on heated glass-rolling apparatus to form a flattened sheet which was then immediately transferred to an annealing oven at 450° C. The annealing temperature was maintained for about thirty minutes and thereafter the sheet was permitted to cool.

The sheet, thus prepared, exhibited a uniform rich ruby coloration, even though no striking step had been performed; and had a composition, in terms of the oxides, approximately as follows:

| Oxide Basis | Parts | Percent |
| --- | --- | --- |
| $SiO_2$ | 1,100 | 69.8 |
| $K_2O$ | 68 | 4.3 |
| $Na_2O$ | 240 | 15.2 |
| $CaO$ | 130 | 8.2 |
| $Al_2O_3$ | 22 | 1.4 |
| $B_2O_3$ | 16 | 1.0 |
| $SnO_2$ | 2.4 | 0.15 |
| $Cu_2O$ | 1.8 | 0.125 |

EXAMPLE 2

When, for the cuprous oxide employed in forming the copper biuret in Example 1, there is substituted an equivalent quantity of cupric oxide, or of one of the acetates, borate, carbonates, chlorides, cyanurate, hydroxides, nitrate, oxalate, phosphates, and sulfates, of copper, comparable results are obtainable.

EXAMPLE 3

When for the stannic oxide employed in Example 1, there is substituted an equivalent quantity of comminuted metallic tin, stannous oxide, or one of the chlorides, oxalate, or sulphates, of tin, comparable results are obtainable.

EXAMPLE 4

When for 23 parts of the sodium carbonate employed in Example 1, there was substituted 17 parts of barium carbonate, there was obtained a finished glass of color, finish, and clarity, superior to that of Example 1.

EXAMPLE 5

When for the barium carbonate of Example 4, there is substituted an equivalent quantity of one of the acetate, borate, chloride, hydroxide, nitrate, nitrite, oxalate, oxide, peroxide, phosphates, silicate, sulfate, and sulfite, of barium, comparable results are obtainable.

EXAMPLE 6

When for the barium carbonate of Example 4, there is substituted an equivalent quantity of one of the acetate, borate, chloride, hydroxide, nitrate, nitrite, oxalate, oxide, peroxide, phosphates, silicate, sulfate, and sulfite, of strontium, satisfactory results are obtainable.

*Advantages*

It was the discovery of the invention, shown, described, and claimed in U.S. Patent No. 2,452,968 to Erwin C. Uihlein and James W. Lawrie that, when beverages, such as beer, containing proteins, are confined in a light-absorbing container which substantially transmits light waves of the order of from about 5,600 angstrom units to about 7,000 or 10,000 angstrom units, and substantially excludes light waves of below and above those approximate limits, there results no damage, and even an inherent improved stabilization of said contents. Comparable results may be obtained with other sensitive substances, notably dairy products, certain other foods, certain pharmaceuticals, and certain light-sensitive chemical compounds.

Ruby glass made in accordance with the present invention, like certain other more expensive copper ruby glasses, is ideal for excluding deleterious wave-lengths and for admitting beneficial wave-lengths. But the cost of glass of equivalent properties in this regard, as previously produced, has precluded its popular use.

Since the cost of urea is low and the amounts of copper and tin required, in accordance with the present invention, to produce a satisfactory color are comparatively small, and since no special provisions on account of toxicity are required, and striking in most cases can be dispensed with, a ruby container glass costing little more than glass of normal composition may be produced by the method of the present invention. Low cost containers are thus made available having the usual advantages of glass, with the additional advantage that there is less deterioration of light-sensitive materials packaged therein. Specific protection is thus made available on a competitive cost basis feasible for the manufacture of even so-called nonreturnable or disposable containers.

The following is a brief summary of an extension comparative test of the effect of light on bottled beer. Five standard brands of beer were each bottled in five different types of bottle, exposed daily from 8 a.m. to 5 p.m., to diffused daylight, supplemented by "daylight" fluorescent lamps, the light intensity at the bottles varying from 45 to 90 foot-candles. Control samples were kept in darkness. After four days of exposure the following was observed. Beer in medium amber non-returnable bottles: characteristic sunstruck odor and taste. Beer in green ale-type bottles, and beer in clear bottles: extreme sunstruck odor and taste. Beer in medium amber export bottles: somewhat sunstruck odor and taste. Beer in ruby bottles: odor normal; taste excellent, even smoother than the control. In another experiment, beer exposed to daylight in returnable and non-returnable ruby bottles for as much as six months showed negligible deterioration.

In addition to its primary use as an inexpensive material ideal for the manufacture of containers for the preservation and improvement of beer and other light-sensitive substances, the colored glass of the present invention affords an inexpensive and unusually attractive material for various aesthetic uses.

In any claim, the mention of any metal is not intended to imply that that metal either does or does not exist in metallic form, except where the form in which it exists is specifically stated in that connection.

What is claimed is:
1. A process for directly forming a ruby red glass having color dependent upon the presence of copper, including the steps of adding to a silicate-glass-making batch a complex comprising a copper-tin-biuret including as components a copper compound, a tin compound and urea in an approximate proportion ranging from 4 to 10 molecules or urea for each atomic weight of cuprous copper, said biuret being in quantities and proportions sufficient to cause the concentration of copper in the finished glass, in terms of copper oxide, to fall between 0.03% and 0.25%, and the concentration of tin, in terms of stannic oxide, to fall between ¼ and 3½ times the concentrate of copper; and then fusing and fining said batch in an open furnace.

2. The process of claim 1 wherein the copper compound and the urea are first reacted together at a temperature ranging from about 120° C. to about 160° C., the reaction product thereof being ground and added to the said batch, said tin compound being added to the batch independently of the copper compound and urea.

3. The process of claim 1, wherein the copper to be added is selected from the group of copper compounds consisting of: cuprous oxide, cupric oxide, and the acetates, borate, carbonates, chlorides, cyanurate, hydroxides, nitrate, oxalate, phosphates, and sulfates, of copper.

4. The process of claim 1, wherein the tin to be added is selected from the group consisting of: metallic tin, stannic oxide, stannous oxide, and the chlorides, oxalate, and sulphates, of tin.

5. The process of claim 1, wherein the copper to be added is selected from the group consisting of: cuprous oxide, cupric oxide, and the acetates, borate, carbonates, chlorides, cyanurate, hydroxides, nitrate, oxalate, phosphates, and sulfates, of copper.

6. The process of claim 1, wherein the glass-making batch includes a metallic compound selected from the group consisting of the acetate, borate, chloride, hydroxide, nitrate, nitrite, oxalate, peroxide, phosphates, silicate, sulfate, carbonate, oxide and sulfite of barium; and the acetate, borate, carbonate, chloride, hydroxide, nitrate, nitrite, oxalate, oxide, peroxide, phosphates, silicate, sulfate, and sulfite, or strontium; in such quantity that the concentration of barium and strontium in the finished glass, in terms of barium oxide and strontium oxide, falls between 0.1% and 1.0%.

References Cited in the file of this patent

UNITED STATES PATENTS

| | | |
|---|---|---|
| 2,174,554 | Dobrovolny et al. | Oct. 3, 1939 |
| 2,233,343 | Dobrovolny et al. | Feb. 25, 1941 |
| 2,354,164 | Weyl | July 18, 1944 |
| 2,672,423 | Lobdell et al. | Mar. 16, 1954 |

FOREIGN PATENTS

| | | |
|---|---|---|
| 460,210 | Great Britain | Jan. 1937 |

UNITED STATES PATENT OFFICE

CERTIFICATE OF CORRECTION

Patent No. 2,922,720                          January 26, 1960

Thomas B. Parks

It is hereby certified that error appears in the printed specification of the above numbered patent requiring correction and that the said Letters Patent should read as corrected below.

Column 6, line 33, for "extension" read -- extensive --; line 68, for "molecules or" read -- molecules of --.

Signed and sealed this 9th day of August 1960.

(SEAL)
Attest:
KARL H. AXLINE
Attesting Officer

ROBERT C. WATSON
Commissioner of Patents